United States Patent
Isaji et al.

(10) Patent No.: US 8,073,606 B2
(45) Date of Patent: Dec. 6, 2011

(54) VEHICLE CONTROL SYSTEM

(75) Inventors: Kazuyoshi Isaji, Kariya (JP); Naohiko Tsuru, Handa (JP)

(73) Assignee: Denso Corporation, Kariya (JP)

( * ) Notice: Subject to any disclaimer, the term of this patent is extended or adjusted under 35 U.S.C. 154(b) by 456 days.

(21) Appl. No.: 12/386,323

(22) Filed: Apr. 16, 2009

(65) Prior Publication Data

US 2009/0265071 A1    Oct. 22, 2009

(30) Foreign Application Priority Data

Apr. 21, 2008    (JP) ................. 2008-110568

(51) Int. Cl.
*B60W 30/08* (2006.01)
*G06F 7/00* (2006.01)

(52) U.S. Cl. ............ 701/70; 701/96; 701/301; 340/435; 340/903

(58) Field of Classification Search .............. 701/70, 701/300, 93, 96, 41, 301; 340/903, 435, 340/436
See application file for complete search history.

(56) References Cited

U.S. PATENT DOCUMENTS

| | | | |
|---|---|---|---|
| 7,395,144 B2 | 7/2008 | Isaji et al. | |
| 2005/0065687 A1* | 3/2005 | Hijikata et al. | 701/41 |
| 2005/0256630 A1* | 11/2005 | Nishira et al. | 701/96 |
| 2006/0095193 A1* | 5/2006 | Nishira et al. | 701/96 |
| 2007/0021876 A1 | 1/2007 | Isaji et al. | |
| 2008/0288152 A1 | 11/2008 | Isaji et al. | |

FOREIGN PATENT DOCUMENTS

| | | |
|---|---|---|
| JP | 06-040270 | 2/1994 |
| JP | 2007-076632 | 3/2007 |
| JP | 2008-074378 | 4/2008 |

OTHER PUBLICATIONS

U.S. Appl. No. 12/284,867, filed Sep. 25, 2008, Isaji et al.

* cited by examiner

*Primary Examiner* — Tan Q. Nguyen
(74) *Attorney, Agent, or Firm* — Harness, Dickey & Pierce, PLC

(57) ABSTRACT

In a vehicle drive control system, a control unit calculates an evaluation index indicating an approach/separation condition of a subject vehicle during a travel and stores this evaluation index together with an inter-vehicle distance with respect to each driver in a memory device. The control unit further calculates a maximum value of the stored evaluation index for each distance, and calculates a relational equation between the distance and the calculated maximum evaluation index. The control unit determines, by correcting the relational equation, a speed control start determination equation, which determines the start timing of the automatic acceleration and/or deceleration control.

6 Claims, 4 Drawing Sheets

VEHICLE CONTROL SYSTEM

CROSS REFERENCE TO RELATED APPLICATION

This application is based on and incorporates herein by reference Japanese Patent Application No. 2008-110568 filed on Apr. 21, 2008.

FIELD OF THE INVENTION

The present invention relates to a vehicle control system, which controls a travel speed of a vehicle.

BACKGROUND OF THE INVENTION

As disclosed in JP 06-40270A (JP 2567548), for example, an inter-vehicle distance control system, which controls a subject vehicle to maintain an inter-vehicle distance from a preceding vehicle at a target inter-vehicle distance based on a relative speed between the subject vehicle and the preceding vehicle. According to this inter-vehicle distance control system, the time constant of a filter for processing a relative speed signal or information (data) is set small when the vehicle speed is high and the inter-vehicle distance is short, and the time constant of the filter is set large when the vehicle speed is low and the inter-vehicle distance is long. The inter-vehicle distance control system improves the control response characteristic by the small time constant and realizes the control stability.

Since the above inter-vehicle control system controls the speed of the subject vehicle to maintain the inter-vehicle distance at the target inter-vehicle distance, the acceleration/deceleration (acceleration and/or deceleration) of the vehicle will not necessarily match acceleration/deceleration, which a driver of the subject vehicle wants.

It is therefore proposed in US 2007/0021876 A1 (JP 2007-076632 A) that a vehicle drive assisting system is configured to accelerate and decelerate a subject vehicle based on a target relative acceleration/deceleration, which is calculated as a target between the subject vehicle and a preceding vehicle, based on a target driver condition coefficient and an actual driver condition coefficient. The target driver condition coefficient is a driver condition coefficient corresponding to a desired drive operation performed by a skilled or model driver to maintain an inter-vehicle distance between the subject vehicle and the preceding vehicle.

However, according to this proposed vehicle drive assisting system, both the target deceleration and the target acceleration are calculated based on only the inter-vehicle distance and the relative speed, and hence the acceleration and the deceleration are still not so satisfactory to a driver at some instances.

It is therefore further proposed in U.S. patent application Ser. No. 12/151,998 (JP patent application No. 2007-128568) filed on May 12, 2008 that a vehicle control system is configured to control acceleration based on a correction distance condition evaluation index KdBc, which is calculated in consideration of a travel speed of a preceding vehicle. This evaluation index indicates approach/separation (approach and/or separation) of the subject vehicle relative to the preceding vehicle. In this US patent application, it is indicated that braking start points (timings) are present on one characteristic curve when the evaluation index KdBc is calculated by the following equation Eq. 1. This is based on a result of testing a vehicle by starting to brake the vehicle at the latest possible timing not to crash the preceding vehicle under a condition that the subject vehicle is approaching the preceding vehicle. This characteristic curve is approximated as the following equation Eq. 2.

$$KdBc = 10 \times \log\{|(-2 \times |Vr| + \alpha \times |Vb|)/(D^3 \times 5 \times 10^{-8})|\} \quad \text{(Eq. 1)}$$

$$KdBc = -23.76 \times \log D + 76.96 \quad \text{(Eq. 2)}$$

For many drivers, use of the approximated equation Eq. 2 as the equation for determining the timing of starting the acceleration control and the deceleration control will provide generally satisfactory and comfortable starting of acceleration and deceleration. However, the timing of starting decelerating operation varies from driver to driver. As a result, the timing of starting the acceleration and deceleration determined by the approximated equation Eq. 2 will possibly be felt too early or too late.

SUMMARY OF THE INVENTION

It is therefore an object of the present invention to provide a vehicle control system, which will provide acceleration control and/or deceleration control at timing most suited to individual drivers.

According to one aspect, a vehicle control system comprises a distance detecting section, a relative speed detecting section, an evaluation index calculating section, a memory section, a maximum value determining section, a relational equation determining section, a threshold equation determining section, a threshold calculating section and a control section.

The distance detecting section detects a distance from a preceding object. The relative speed detecting section detects a relative speed relative to the preceding object. The evaluation index calculating section calculates an evaluation index of the subject vehicle as an index indicating an approach/separation condition relative to the preceding object as a function of a travel speed of the preceding object. The evaluation index is increased as the relative speed of approaching the preceding object becomes higher, and a rate of increase thereof is increased as the distance becomes shorter.

The memory section stores each evaluation index calculated during travel of the subject vehicle together with the inter-vehicle distance detected at calculation of the evaluation index. The maximum value determining section determines a maximum value of the evaluation index stored in the memory section with respect to each distance. The relational equation determining section determines a relational equation based on the maximum value. The relational equation defines the distance from the preceding object and the maximum value of the evaluation index of each distance. The threshold equation determining section determines a threshold equation by correcting the relation equation. The threshold equation defines a relation between the distance from the preceding object and a threshold of the evaluation index of each distance and determines a value, which is greater or less than the evaluation index determined by the relational equation. The threshold calculating section calculates a deceleration threshold or an acceleration threshold based on the threshold equation and the distance from the preceding object. The control section starts the deceleration control or the acceleration control of the subject vehicle when the evaluation index is greater or less than the deceleration threshold or the acceleration threshold.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EXEMPLARY EMBODIMENT

The present invention will be described below with reference to one embodiment, in which a vehicle control system is implemented as a drive assisting system of a subject vehicle.

Figure 1:
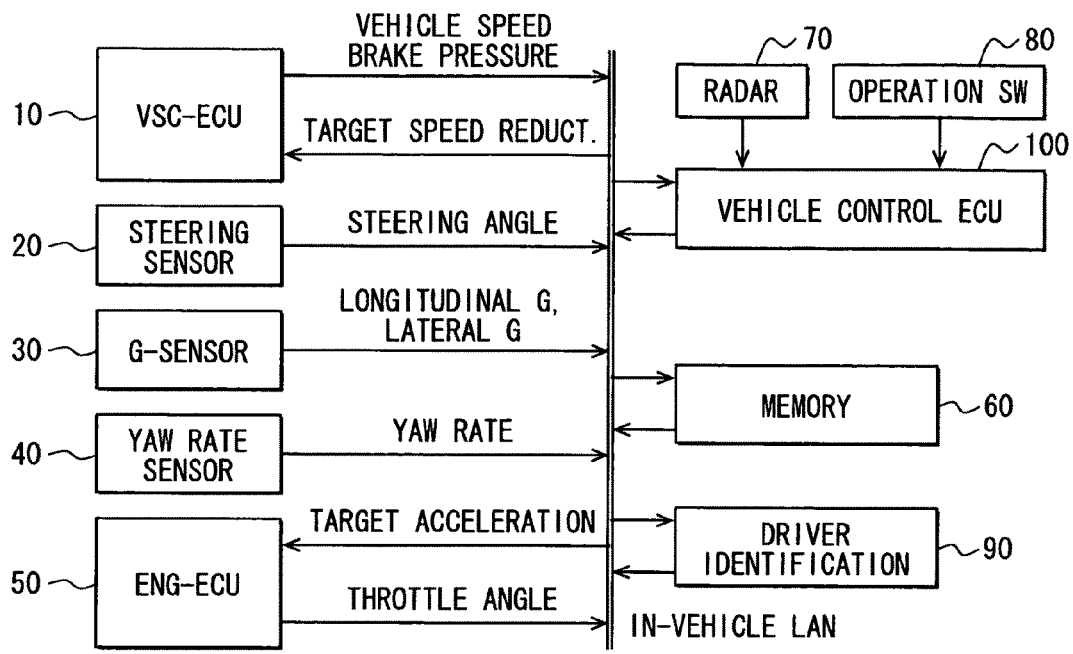
FIG. 1 is a block diagram showing a vehicle drive assisting system according to one embodiment of the present invention.

Referring first to FIG. 1, the vehicle drive assisting system is configured with a VSC-ECU 10, a steering sensor 20, a G-sensor 30, a yaw rate sensor 40, an ENG-ECU 50, a memory device 60, a radar device 70, an operation switch device 80, a driver identification device 90 and a vehicle control ECU 100.

The VSC-ECU 10 is for controlling a brake actuator (not shown), which applies braking force to the subject vehicle, and has a function of vehicle stability control (VSC), which suppresses skidding of the subject vehicle. The VSC-ECU 10 is configured to receive information about a target deceleration from an in-vehicle local area network (LAN) and control the brake actuator so that the subject vehicle attains the target deceleration. The VSC-ECU 10 is configured to transmit information about a travel speed Vs0 of the subject vehicle as well as the braking force.

The steering sensor 20 is configured to detect information about a steering angle of a steering wheel (not shown) of the subject vehicle and transmit the steering angle information to the in-vehicle LAN.

The G-sensor 30 is configured to detect acceleration (G) generated in the longitudinal (front-rear) direction and the lateral (left-right) direction of the subject vehicle and transmit information of the longitudinal G and the lateral G to the in-vehicle LAN.

The yaw rate sensor 40 is configured to detect an angular velocity (yaw rate) about a vertical axis of the subject vehicle.

The ENG-ECU 50 is configured to receive information about a target acceleration from the in-vehicle LAN and control a throttle actuator (not shown) so that the subject vehicle may attain the target acceleration.

The memory device 60 is a rewritable memory such as an EEPROM and is configured to store an evaluation index KdBc calculated by the vehicle control ECU 100 from time to time during vehicle travel as well as an inter-vehicle distance (distance from a preceding vehicle) D at the calculation time of KdBc with respect to each driver. The evaluation index KdBc is calculated to indicate an approach/separation condition of the subject vehicle relative to the preceding vehicle.

The radar 70 is configured to radiate a laser beam, for example, in a predetermined front area of the subject vehicle, receive a reflected beam from a preceding object including the preceding vehicle, detect various parameters and transmit them to the in-vehicle LAN. The parameters are the inter-vehicle distance D between the subject vehicle and the preceding vehicle, a relative travel speed Vr between the subject vehicle and the preceding vehicle, a deviation (lateral deviation) of the central axes of the subject vehicle and the preceding vehicle in the lateral direction and the like.

The operation switch device 80 includes a group of switches manipulated by a driver of the subject vehicle and is configured to transmit information of manipulation to the vehicle control ECU 100.

The driver identification device 90 is configured to identify a driver each time the driver takes a driver's seat. It is provided with a camera for taking a photo of the driver on the driver's seat and a computer for performing processing of face recognition based on the photo image. The driver identification device 90 may be configured to identify each driver based on biometric information such as fingerprints or other non-biometric information such as ID code inputted by a driver.

The vehicle control ECU 100 is configured to determine the timing of starting automatic acceleration control or the timing of starting automatic deceleration control by using the equation of speed control start determination at the time of traveling while following the preceding vehicle.

The vehicle control ECU 100 is configured to perform the acceleration/deceleration control to generate a target acceleration and/or deceleration GDp of the subject vehicle, which is calculated based on a target relative speed Vrct and a relative speed Vrcp of the subject vehicle corresponding to a speed control start determination equation. Thus, acceleration and deceleration of the subject vehicle are controlled to match each driver's desire or preference in various vehicle travel instances.

The vehicle control ECU 100 is configured to determine, before the acceleration/deceleration control, the speed control start determination equation for each driver based on the evaluation index KdBc as well as the inter-vehicle distance D relative to the preceding vehicle at the time of calculation of the evaluation index KdBc.

The speed control start determination equation is determined as follows.

The vehicle control ECU 100 periodically calculates the evaluation index KdBc by using the equation Eq. 1 while the subject vehicle is in travel. In this calculation of the evaluation index KdBc, the inter-vehicle distance D and the relative speed Vr are calculated by using the detection outputs of the radar 70, and the speed of travel of the preceding vehicle is calculated by using the relative speed and the travel speed Vs0 of the subject vehicle. In the equation Eq. 1, $\alpha$ is a constant and may be set to about 0.3 for example.

As understood from the equation Eq. 1, the evaluation index KdBc increases as the relative speed Vr relative to the preceding vehicle becomes larger, and its rate of increase increases as the inter-vehicle distance D relative to the preceding vehicle becomes shorter with respect to each relative speed Vr.

Figure 2:
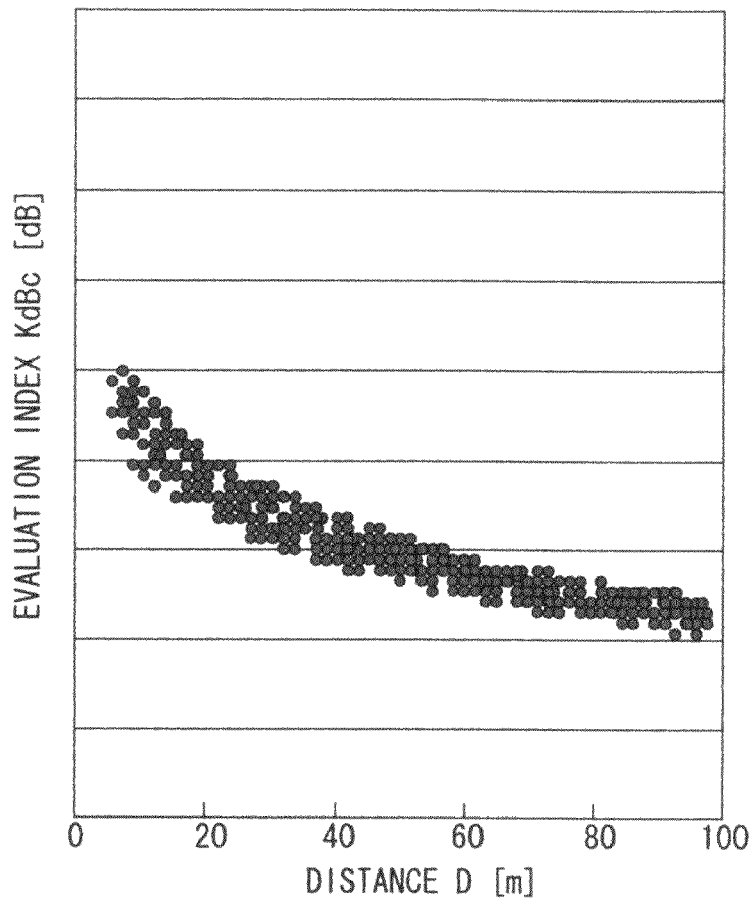
FIG. 2 is a graph showing an exemplary relation between an evaluation index and an inter-vehicle distance.
Figure 3:
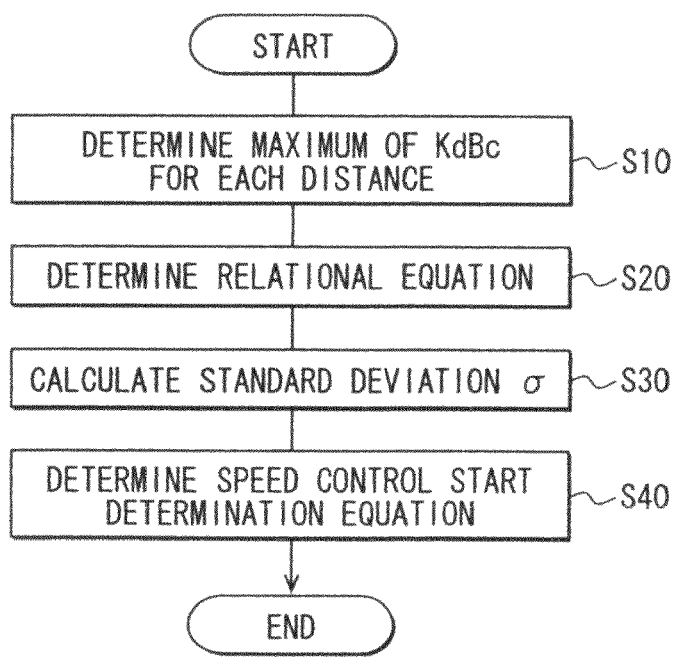
FIG. 3 is a flowchart showing processing of a speed control start determination executed in the embodiment.

The vehicle control ECU 100 stores both the evaluation index KdBc and the inter-vehicle distance D, which exists at the time of calculation of the evaluation index KdBc, in the memory device 60 with respect to each driver when the evaluation index KdBc is calculated. If the inter-vehicle distance D and the evaluation index KdBc calculated at every predetermined interval with respect to one specified driver are plotted, a characteristic curve shown in FIG. 2 is produced. In this example, the calculation of the evaluation index KdBc is not limited to the instance of vehicle braking operation. Therefore, a plenty of evaluation indexes KdBc are plotted over a wide range of inter-vehicle distances D.

The vehicle control ECU 100 is configured and programmed to execute the processing of determining a speed control start determination equation when a predetermined condition is satisfied, that is, when a predetermined number of evaluation indexes KdBc are stored or a predetermined time has elapsed after the start of travel of the vehicle.

At step S10, a maximum value of the evaluation indexes KdBc, which are stored in the memory device 60, for each distance (each predetermined segment of distance Sd) is determined with respect to each driver, whose relational equation determination condition is satisfied.

Figure 4:
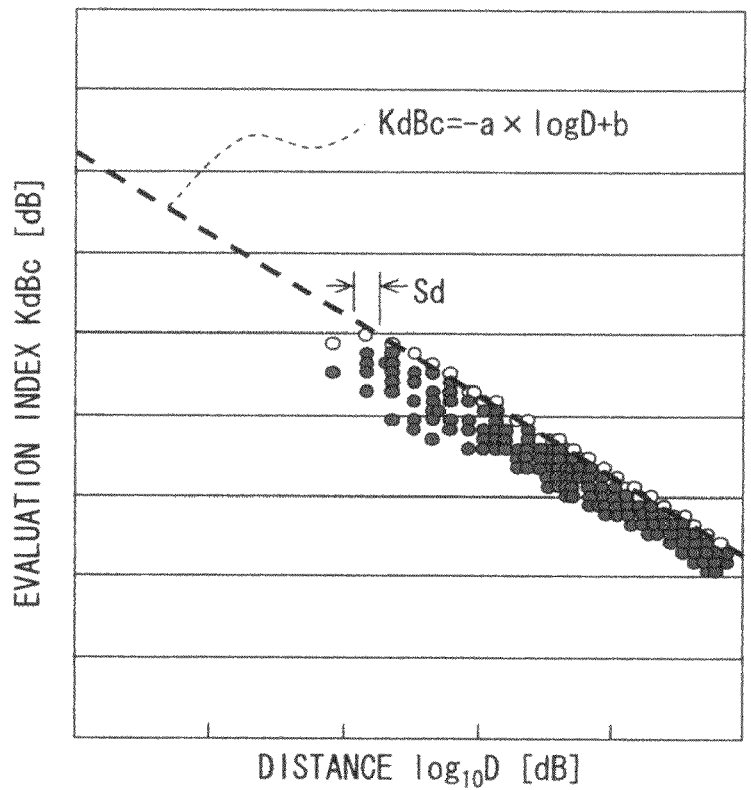
FIG. 4 is a graph showing the relation shown in FIG. 2 with the inter-vehicle distance in the abscissa converted into a logarithmic value.

At step S20, a relational equation between the maximum value of the evaluation index KdBc for each distance and the inter-vehicle distance D is determined. In. FIG. 4, in which the abscissa indicates a distance in the logarithmic value ($\log_{10} D$), the calculated maximum value of the evaluation index KdBc for each distance is shown by a white circle and the determined relational equation is shown by a dotted line. This relational equation is determined based on the least-square method by using all the maximum values determined at step S10.

It is understood that the driver: whose driving characteristic is shown in FIG. 4 accelerates and decelerates the subject vehicle to maintain the inter-vehicle distance D, which will not exceed the evaluation value KdBc determined from this relational equation. In determining the maximum value at step S10 and the relational equation at step S20, all the data stored in the memory device 60 with respect to the specified driver need not be used but only data stored with respect to the latest fixed period may be used.

At next step S30, a standard deviation σ of the maximum values relative to the relational equation determined at step S20 is calculated. At step S40, a deceleration control start determination equation and an acceleration control start determination equation are determined by correcting the relational equation determined at step S20 by a correction value (for example, 3σ), which corresponds to the standard deviation σ calculated at step S30. Specifically, assuming that the relational equation determined at step S20 is defined as the following equation Eq. 3, the deceleration control start determination equation and the acceleration control start determination equation are defined as the following equations Eq. 4 and Eq. 5, respectively. In those equations, Eq. 3, Eq. 4 and Eq. 5, "a" and "b" are a multiplier coefficient and a proportionality constant of the relational equation determined at step S20, respectively.

$$KdBc = -a \times \log D + b \qquad \text{(Eq. 3)}$$

$$kdBc = -a \times \log D + b + 3\sigma \qquad \text{(Eq. 4)}$$

$$KdBc = -a \times \log D + b - 3\sigma \qquad \text{(Eq. 5)}$$

Figure 5:
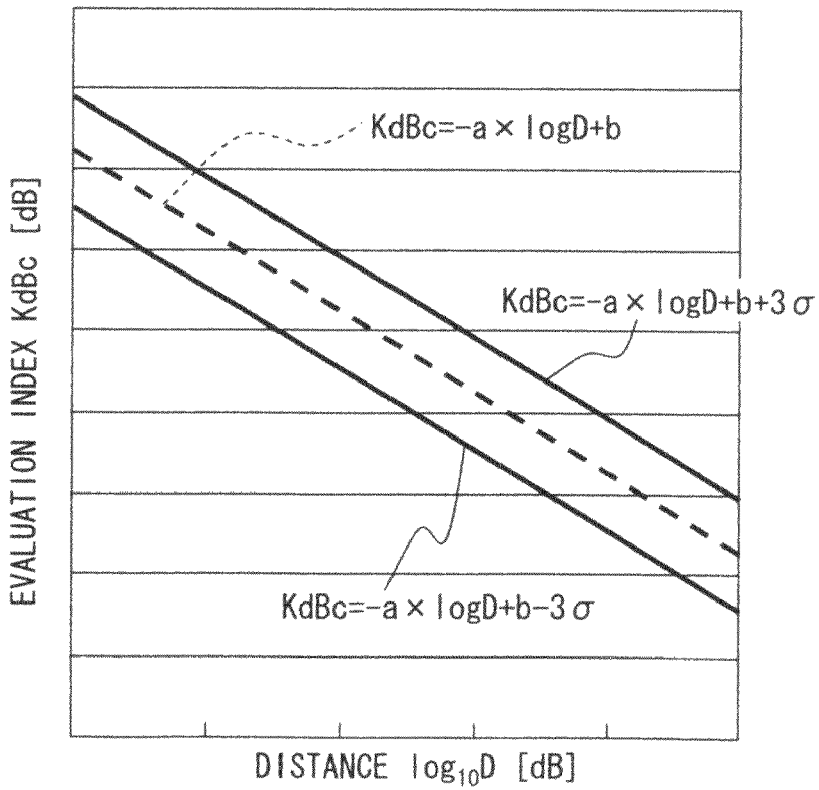
FIG. 5 is a graph showing a relation of a deceleration control start determination equation and an acceleration control start determination equation relative to an equation of standard deviation.

The equations Eq. 4 and Eq. 5 for the deceleration control start determination and the acceleration control start determination are shown by solid lines in FIG. 5 as the speed control start determination equation. This speed control start determination equation is a threshold equation, which is used for calculating an acceleration and/or deceleration threshold in speed control processing described below.

As understood from FIG. 5, for each inter-vehicle distance D, the evaluation index (that is, deceleration threshold) KdBc determined by the deceleration control start determination equation Eq. 4 is greater than the evaluation index KdBc determined by the relational equation Eq. 3. Further, for each inter-vehicle distance D, the evaluation index (that is, acceleration threshold) KdBc determined by the acceleration control start determination equation Eq. 5 is less than the evaluation index KdBc determined by the relational equation Eq. 3.

It is to be noted that the evaluation index KdBc determined by the equations Eq. 3 is the evaluation index itself corresponding to a time point at which a driver accelerates or decelerates a vehicle. If this evaluation index KdBc of equation Eq. 3 is used, it is very likely that the drive control will be influenced too much and cause uncomfortableness or uneasiness to a driver. Therefore, the threshold is not determined by the evaluation index KdBc of equation Eq. 3 but is determined by the equations Eq. 4 and Eq. 5, which are determined by correcting the equation Eq. 3.

Figure 6:
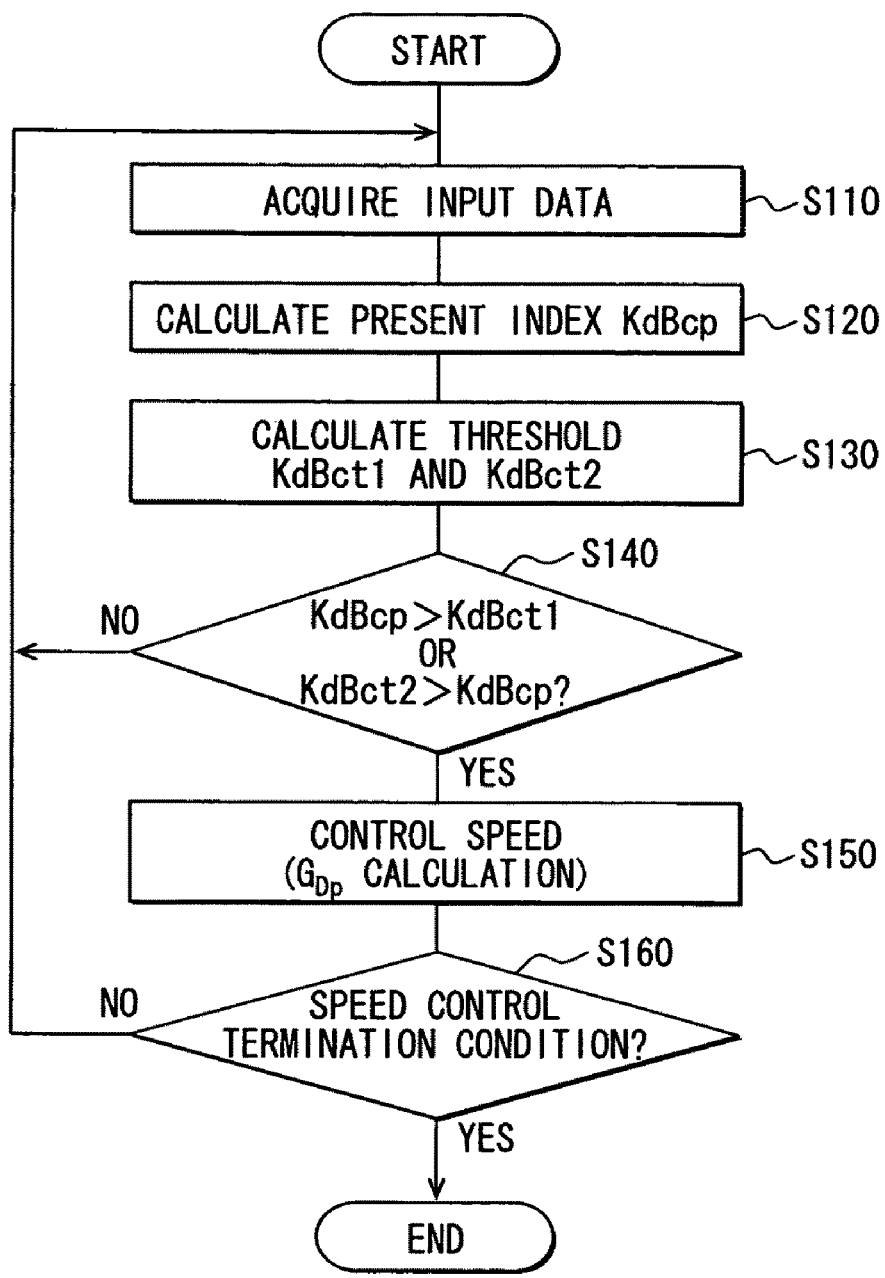
FIG. 6 is a flowchart showing processing of acceleration/deceleration control using a speed control start determination equation.

The acceleration/deceleration control processing using the speed control start determination equation is described next with reference to FIG. 6. This processing is executed when the subject vehicle is driven to follow the preceding vehicle.

At step S110, input data are acquired from various sensors and devices shown in FIG. 1. At next step S120, a present value KdBcp of the evaluation index KdBc is calculated by using the input data acquired at step S110 and the equation Eq. 1 of KdBc.

At step S130, a deceleration control start threshold (deceleration threshold) KdBct1, which corresponds to an actual (present) inter-vehicle distance Dp between the subject vehicle and the preceding vehicle, is calculated based on the deceleration control start determination equation of Eq. 4. In addition, an acceleration control start threshold (acceleration threshold) KdBct2, which corresponds to the actual (present) inter-vehicle distance Dp, is calculated based on the acceleration control start determination equation of Eq. 5.

At step S140, it is checked whether the present evaluation index KdBcp is greater than the deceleration control start threshold KdBct1 or less than the acceleration control start threshold KdBct2, or whether the present evaluation index KdBcp is between the deceleration control start threshold KdBct1 and the acceleration control start threshold KdBct2. If the present evaluation index KdBcp is greater than the threshold KdBct1 or less than the threshold KdBct2 (S140: YES), step S150 is executed. If the present evaluation index KdBcp is between the two thresholds KdBct1 and KdBct2 (S140: NO), the processing returns to step S110 to repeat the steps S110 to S140.

At step S150, a target acceleration/deceleration GDp, which the subject vehicle should attain, is calculated by the following equation Eq. 6.

$$GDp = (Vrcp - Vrct)/T \qquad \text{(Eq. 6)}$$

In this equation Eq. 6, Vrcp is the actual relative speed of the subject vehicle, and Vrct is a target relative speed, which is calculated by substituting the evaluation index KdBct for the actual (present) inter-vehicle distance Dp, which is determined from the relational equation Eq. 3, into the equation Eq. 1. T is a divisor for converting a difference between the actual relative speed Vrcp at the present time and the target relative speed Vrct into the acceleration/deceleration GDp of the subject vehicle, and may be set arbitrarily.

At step S160, it is checked whether a speed control termination condition is satisfied. This termination condition may include that the subject vehicle is at rest or stopped or that the present evaluation index KdBcp is between the deceleration control start threshold KdBct1 and the acceleration control start threshold KdBct2. If the control termination condition is not satisfied, the processing returns to step S110 to repeat the above processing again.

As described above, the vehicle drive assisting system according to the embodiment calculates the evaluation index KdBc at every predetermined interval during travel of the subject vehicle, and stores the calculated evaluation index KdBc in its memory device 60 together with the inter-vehicle distance D of the calculation time with respect to each driver.

The vehicle drive assisting system then determines the maximum value of the stored evaluation index of each driver with respect to each distance, determines the relational equation Eq. 3 between the inter-vehicle distance D from the preceding vehicle and the maximum evaluation index for each distance. The vehicle drive assisting system further determines the determination equations Eq. 4 and Eq. 5 by correcting the relational equation Eq. 3, so that the timing of starting the acceleration/deceleration control is determined thereby. That is, the determination equations for determining the acceleration/deceleration control start timing is calculated based on the maximum value of the evaluation index KdBc, which is calculated to determine the approach/separation condition for each distance during the actual travel. As a result, the acceleration/deceleration control can be performed at the timing most suited to the preference of each driver.

The present invention should not be limited to the above embodiment but may be implemented in many other ways.

For example, the correction values in the equations Eq. 4 and Eq. 5 may be variably set by a driver. According to the absolute values of the correction values, the equations Eq. 4 and Eq. 5 deviate from the relational equation of Eq. 3 differently. Therefore, by changing this deviation, the start timing of the acceleration control and/or the deceleration control can be automatically advanced or delayed.

If the correction values in the equations Eq. 4 and Eq. 5 are adjustable by a driver, the driver is allowed to variably set the start timing of the acceleration control and/or the deceleration control in accordance with the driver's mental condition, physical condition and the like. The control may be limited to either the acceleration control or the deceleration control.

What is claimed is:

1. A vehicle control system comprising:
   distance detecting means configured to detect a distance from a preceding object;
   relative speed detecting means configured to detect a relative speed relative to the preceding object;
   evaluation index calculating means configured to calculate an evaluation index of the subject vehicle as an index indicating an approach/separation condition relative to the preceding object as a function of a travel speed of the preceding object, the evaluation index being increased as the relative speed of approaching the preceding object becomes higher and a rate of increase thereof being increased as the distance becomes shorter;
   memory means configured to store each evaluation index calculated during travel of the subject vehicle together with the inter-vehicle distance detected at calculation of the evaluation index;
   maximum value determining means configured to determine a maximum value of the evaluation index stored in the memory means with respect to each distance;
   relational equation determination means configured to determine a relational equation based on the maximum value, the relational equation defining the distance from the preceding object and the maximum value of the evaluation index of each distance;
   threshold equation determining means configured to determine a threshold equation by correcting the relation equation, the threshold equation defining a relation between the distance from the preceding object and a threshold of the evaluation index of each distance and determining a value, which is greater than the evaluation index determined by the relational equation;
   threshold calculating means configured to calculate a deceleration threshold based on the threshold equation and the distance from the preceding object; and
   control means configured to start deceleration control of the subject vehicle when the evaluation index is greater than the deceleration threshold.

2. The vehicle control system according to claim 1, further comprising:
   driver specifying means configured to specify a driver in the subject vehicle,
   wherein the memory means, the maximum value determining means, the relational equation determining means and the threshold determining means perform respective operations with respect to each driver specified by the driver specifying means.

3. The vehicle control system according to claim 1, wherein the threshold equation is adjustable by a driver of the subject vehicle relative to the relational equation.

4. A vehicle control system comprising:
   distance detecting means configured to detect a distance from a preceding object;
   relative speed detecting means configured to detect a relative speed relative to the preceding object;
   evaluation index calculating means configured to calculate an evaluation index during travel of the subject vehicle as an index indicating an approach/separation condition relative to the preceding object as a function of a travel speed of the preceding object, the evaluation index being increased as the relative speed of approaching the preceding object becomes higher and a rate of increase thereof being increased as the distance becomes shorter;
   memory means configured to store each evaluation index calculated during the travel of the subject vehicle together with the inter-vehicle distance detected at calculation of the evaluation index;
   maximum value determining means configured to determine a maximum value of the evaluation index stored in the memory means with respect to each distance;
   relational equation determination means configured to determine a relational equation based on the maximum value, the relational equation defining the distance from the preceding object and the maximum value of the evaluation index of each distance;
   threshold equation determining means configured to determine a threshold equation by correcting the relation equation, the threshold equation defining a relation between the distance from the preceding object and a threshold of the evaluation index of each distance and determining a value, which is less than the evaluation index determined by the relational equation;
   threshold calculating means configured to calculate an acceleration threshold based on the threshold equation and the distance from the preceding object; and
   control means configured to start acceleration control of the subject vehicle when the evaluation index is less than the acceleration threshold.

5. The vehicle control system according to claim 4, further comprising:
   driver specifying means configured to specify a driver in the subject vehicle,
   wherein the memory means, the maximum value determining means, the relational equation determining means and the threshold determining means perform respective operations with respect to each driver specified by the driver specifying means.

6. The vehicle control system according to claim 4, wherein the threshold equation is adjustable by a driver of the subject vehicle relative to the relational equation.

* * * * *